United States Patent [19]
Botros

[11] 3,791,785
[45] Feb. 12, 1974

[54] AROMATIC POLYESTER TEXTILE FIBERS DYED WITH BIS(ARYLAMINO) DIHYDROXYANTHRAQUINONE DYES

[75] Inventor: Raouf Botros, Lock Haven, Pa.

[73] Assignee: American Aniline Products, Inc., Lock Haven, Pa.

[22] Filed: May 17, 1972

[21] Appl. No.: 253,995

Related U.S. Application Data

[63] Continuation-in-part of Ser. No. 222,361, Jan. 31, 1972.

[52] U.S. Cl.................. 8/39, 260/377, 260/380
[51] Int. Cl...... D06p 3/54, C07c 97/14, C09b 1/50
[58] Field of Search..... 8/39 R, 39 C, 179; 260/377, 260/380

[56] References Cited
UNITED STATES PATENTS
1,969,735  8/1934  Ellis et al............................. 8/40 X
2,480,269  8/1949  Seymour et al................. 260/380 X

OTHER PUBLICATIONS

Salvin et al., "Relation of Dye Structure to Properties of Disperse Dyes," American Dyestuff Reporter, July 13, 1959.

Primary Examiner—Donald Levy
Assistant Examiner—Bruce H. Hess
Attorney, Agent, or Firm—Armstrong & Wegner

[57] ABSTRACT

Aromatic polyester textile material is dyed with anthraquinone dyes made by the reaction of an arylamine, such as aniline, with a dichloro-dihydroxyanthraquinone in which one of the chlorine atoms is in a non-peri position, the reaction being conducted in the presence of an acid acceptor and a copper catalyst. This class of anthraquinone dyes, when appropriately dispersed, provides clear blue dyeings on aromatic polyester fabrics with excellent substantivity, very good sublimation fastness, and excellent fastness to light. The dyes are applied to polyesters, such as polyethylene terephthalate, by carrier, pressure and thermofixation methods.

5 Claims, No Drawings

AROMATIC POLYESTER TEXTILE FIBERS DYED WITH BIS(ARYLAMINO) DIHYDROXYANTHRAQUINONE DYES

CROSS REFERENCE TO RELATED APPLICATIONS

This application is a continuation-in-part of my copending application Ser. No. 222,361 filed Jan. 31, 1972.

BACKGROUND OF THE INVENTION

Among the polyester fibers, those based on polyethylene terephthalate continue to be the most important, although fibers based on 1,4-dimethylcyclohexane terephthalate have become commercially available. Developments in both homo- and copolyesters have continued and many modified versions of polyethylene terephthalate have recently appeared on the market. With the advent of new fibers, the search has continued for dyes which build up on the various types of polyester fabric proportionate to the amount of dye applied, and which are characterized by good light and excellent sublimation properties.

In polyester fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

Bis(arylamino)dihydroxyanthraquinones are known as colors for cellulose acetate or organic derivatives of cellulose from the teachings of Seymour and Salvin, U.S. Pat. No. 2,480,269. In the dyes of Seymour and Salvin, both of the arylamino groups are in a peri-position because the dyes are made by the replacement of the nitro groups of 4,5-dinitro chrysazin or 4,8-dinitro-anthrarufin. Ellis in U.S. Pat. No. 1,969,735 suggests that certain dyes made by the reaction of an aryl amine with a dichloroanthrarufin can be used or cellulose esters or ethers.

I have discovered that certain bis(arylamino)dihydroxyanthraquinone dyes provide dyeings of a deep blue hue when applied to polyester textile material by conventional methods. Dyed fabric provided by the invention can be after-treated as required with excellent results.

SUMMARY OF THE INVENTION

In accordance with the invention, there is provided aromatic polyester textile material dyed with a dye of the formula:

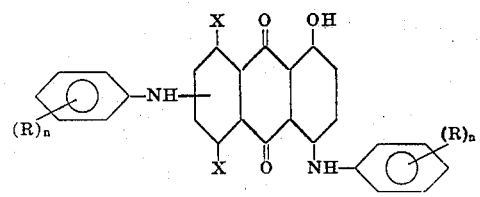

In the above formula, one X is H and the other is OH; R is a member selected from the group consisting of hydrogen, chlorine, bromine, alkyl having from 1-8 carbon atoms, alkoxy having from 1-8 carbon atoms, hydroxy lower alkyl, N-lower alkylamino, N,N-di lower alkylamino, lower alkoxy lower alkyl, lower alkoxy lower alkoxy and acylamido having up to 7 carbon atoms. The term lower designates an alkyl group having up to 6 carbon atoms. $n$ has a value of 1–3.

The dyes for use in the invention are made by admixing a 4,z-dihalochrysazin or 4,y-dihaloanthrarufin in which z may be the 7-position and y may be the 6-position, an aryl amine of the formula

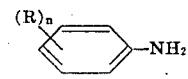

in which $R$ and $n$ are defined above, an acid acceptor and copper catalyst. The mixture is allowed to react at an elevated temperature of 125° C up to the reflux temperature of the mixture until the reaction is substantially complete and the product is recovered therefrom by diluting the reaction mass with ethanol or methanol whereupon the product comes out of solution and can be isolated by filtration.

The dyes are applied to aromatic polyester textile material, including mixed blends of polyester-cotton, by any of the standard methods of carrier dyeing, pressure dyeing or thermofixation.

DETAILED DESCRIPTION

The starting material for making the dyes used in the invention is a dihalochrysazin or diahaloanthrarufin made by treating chrysazin or anthrarufin with sulfuryl chloride or bromine in nitrobenzene at reflux for several hours. The resulting product is a 4,z-dihalochrysazin or a 4,y-dihaloanthrarufin, in which [i z may be the 7-position and $y$ may be the 6-position of the anthraquinone nucleus. The literature reports the dichlorination of chrysazin (1,8-dihydroxyanthraquinone) by treating it with chlorine in aqueous acetic acid at 100° C; DRP 127,669 Frdl. 6 328. An alternate process is described in DRP 172,300, Frdl. 8 274, in which chrysazin is treated in aqueous sulfuric acid at 125° with potassium chlorate and sodium chloride. The products of both processes are said to be 4,5-dichlorochrysazin. However, according to the experimental results using my recommended halogenation procedure, one of the halogens is in a non-peri position. The dihalochrysazin or dihaloanthrarufin thus produced provides a unique product when treated according to the method of the invention.

The dihalodihydroxyanthraquinone is allowed to react with at least a stoichiometric quantity of an aryl amine of the formula:

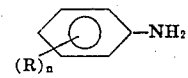

Aryl amines which may be used to produce dyes of the invention include: aniline; o,m,p-toluidine; the various xylidines; o,m, and p-dichloroaniline; o,m, and p-anisidines and phenetidines; p-aminoacetanilide; N-methyl-p-phenylenediamine; N,N-dimethyl-p-phenylenediamine; p-butylaniline;p-n-octylaniline; p-t-butylaniline; p-amylaniline; p-n-heptylaniline; 2-[p-(aminoanilino)]ethanol; 2-(p-aminophenyl)ethanol; 2(p-aminophenoxy) ethanol; p-(2-methoxyethoxy)aniline; p-aminopropionanilide; and 8-(p-aminophenyl)-n-octanol.

The reaction is conducted in the presence of an alkaline acid-binding agent and a copper salt. Particularly useful acid-binding agents include the alkali metal carbonates, bicarbonates and acetates. Sodium acetate is preferred. The efficiency of the reaction is improved by the presence of a catalytic amount of a copper catalyst, such as copper sulfate or copper acetate.

The reaction mixture is heated to an elevated temperature between 120° C and the reflux temperature of the reaction mixture, usually about 220° C. It is convenient to use an excess of the amine reactant as a reaction medium, although it is possible to use substantially stoichimetric amounts of reactants in the presence of an inert solvent. After completion of the reaction, which generally takes between 4–24 hours, the product is separated and recovered by conventional methods.

A particularly convenient way to recover the product in a purified form is to dilute the reaction mixture with methanol or denatured alcohol in an amount of 100 to 300% based on the volume of the reaction mixture. In this method of product recovery, the reaction mixture is first cooled, the alcohol is added and the mixture is reheated to reflux. It is then allowed to cool gradually to room temperature, filtered, and the product collected on the filter is washed again with alcohol and thereafter, oven-dried. When suitable, the alcohol solution of the reaction mixture may be filtered hot.

To prepare the product for application to the polyester substrates the product must be suitably dispersed. This may be done in any of several well-known methods, milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium di-naphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100° C (104°–212° F) to give a colored fiber containing about 0.01–2 percent by weight dye (100% color basis).

Alternatively, dyeing may be accomplished without a carrier at temperatures of 100°–150° C under pressure. Also, the dye may be applied in patterns by conventional printing methods, if desired.

The dye can be also applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220° C (356°–428° F) are used for 30 to 90 seconds. If the fabric contains cotton or viscose rayon, apart from synthetic fibers, there is little danger of damaging cellulosic portions, but if wool is present, the temperature must be kept within 180°–200° C and the time must be reduced to 30 seconds.

In order to evaluate the effectiveness of a particular dye for a given type of fiber, the dyed fiber is examined for substantivity of the color, light fastness of the color, and resistance of the color to sublimation and washing. Specific tests for the evaluation of these important properties are described in the examples that follow.

My invention is further illustrated by the following examples:

EXAMPLE 1

4,z-Dichlorochrysazin

Charged into a 1 liter 4-neck flask, equipped with stirrer, thermometer and reflux condenser,
96 g. — chrysazin (0.4 mole)
400 g. — nitrobenzene, and
250 g. — sulfuryl chloride.

The mixture was heated slowly; reflux began about 60°C. Heating was continued for 85°C and the temperature was maintained at 85°–90°C for 6 hours. The reaction mixture was agitated overnight. The mass was filtered and the product was washed first with
150 ml. — denatured alcohol.
It was then washed acid free with water and dried in an oven. Yield: 99 g. Th. Yield: 123.6 g. (80%)

EXAMPLE 2

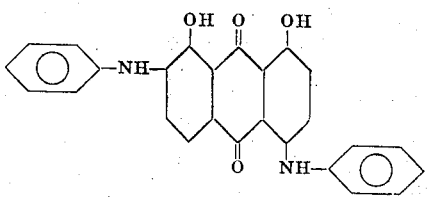

Charged into a 500 ml. 4-neck flask, equipped with stirrer, thermometer and a condensate trap attached to an air condenser,
150 g. — aniline, 31 g. — 4,z-dichlorochrysazin (0.1 mole) prepared as described in Example 1,
20 g. — anhydrous sodium acetate, and
0.5 g. — cupric acetate.

The reaction mixture was heated at 155°–160° for 4 hours. The mass was stirred to 80° and was diluted with 250 ml. — denatured alcohol.

The mixture was heated to reflux, after which it was allowed to cool to room temperature overnight. The mass was filtered and the cake was washed first with 100 ml. — denatured alcohol, then with hot water until washings were clear. The cake was sucked dry.

Yield: 65 g. (wet cake) = 35 g. dry content
Th. Yield: 42 g. (83%)
The cake was not dried.

Standardization

A 10% color content paste was made. Charged to a ballmill
64 g. — wet cake = 34 g. 100% color,
66 g. — sodium ligninsulfonate (Lignosol FTA), and 210 g. — water.

The mixture was milled until dispersion test was satisfactory.

EXAMPLE 3

An aqueous dye bath containing 10% Marcron L (a commercially available phenolic dye carrier) and 1% monosodium phosphate as a buffering agent was prepared. Type 54 "Dacron" polyester fabric was treated in a bath at 120° C for 10 minutes, the fabric-to-water dye bath ratio being 1 : 40. The disperse dye made as described in Example 2 was added in an amount sufficient to provide a bath containing 0.4% dye based on the weight of polyester fibers. Dyeing was continued for one hour at 205° F and the fabric was removed from the bath, rinsed and dried. Sample dyeings were tested for sublimation according to standard AATCC Color Fastness to Dry Heat (sublimation) Test No. 117-1967T, Page 123 of the 1970 Technical Manual of the American Association of Textile Chemists and Colorists. Dyed fabric was placed between a sandwich of undyed "Dacron" polyester fabric and heat was applied for 30 seconds. Sublimation tests were made at 350° F and 400° F on goods as described above. The dyeing was characterized by a clear blue hue. Sublimation tests showed very little transfer of color, even at 400° F.

Similar very good results were obtained when the dye was applied to the fabric by thermofixation methods and then tested for sublimation as described above.

The dyeings were also treated for light fastness by subjecting them to carbon arc fading in accordance with AATCC, Color Fastness to Light, Carbon Arc Lamp, Continuous Light Test No. 16A-1964, as detailed on page 127 of the 1970 Technical Manual of the AATCC. The dyeings showed break at 20 hours' exposure, indicating excellent fastness to light.

EXAMPLE 4

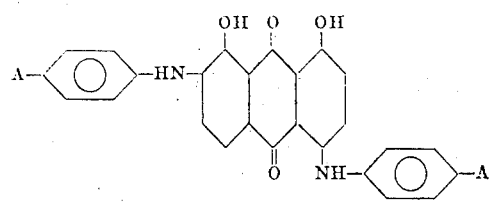

where A is independently hydrogen or methyl group charged into a 500 ml. 4-neck flask, equipped with stirrer, thermometer and a condensate trap attached to an air condenser,
60 g. — p-toluidine, and
60 g. — aniline.

The mixture was heated to 60°C. Then there was added 31 g. — 4,z-dichlorochrysazin (0.1 mole), prepared as described in Example 1,
20 g. — anhydrous sodium acetate, and
0.5 g. — cupric acetate.

The reaction mixture was heated at 155°–160°C for 5 hours. When the reaction mixture was worked up as indicated in Example 2, 36 g. of a dye having the above structure was obtained. When dispersed and applied to polyester fabric, as described in Example 3, the dyeing was characterized by a bright greenish blue hue of excellent sublimation and good light fastness. The dyeing was also characterized by retention of hue under different sources of artificial light.

EXAMPLE 5

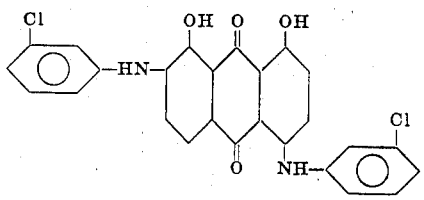

charged into a 500 ml. 4-neck flask, equipped with stirrer, thermometer and a condensate trap attached to an air condenser
120 g. — m-chloroaniline,
31 g. — 4,z-dichlorochrysazin, prepared as described in Example 1,
20 g. — anhydrous sodium acetate, and
0.5 g. — cupric acetate.

The reaction mixture was heated at 170°–175°C for 17 hours.

When the reaction mixture was treated as described in Example 2, 37 g. of a dye having the above structure was obtained. The dispersed dye has an excellent color value when applied to the polyester fabric specially by thermofixation methods. The dyeing was characterized by a reddish blue hue of excellent sublimation and excellent light fastness.

EXAMPLE 6

When 150 g. aniline in Example 2 was replaced by 120 g. p-toluidine, 36 g. of a dye having the structure:

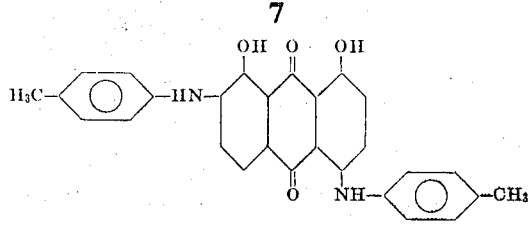

was obtained. When dispersed and applied to polyester fabric as described in Example 3, the dyeing was characterized by a bright greenish blue hue of good light fastness and very good sublimation. The dyeing also retained its hue under different sources of artificial light.

EXAMPLE 7

When 150 g. aniline in Example 2 was replaced by 120 g. p-anisidine, 34 g. of a dye having the structure:

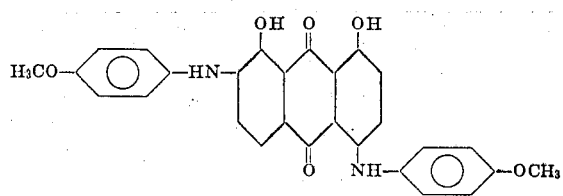

was obtained. When dispersed and applied to polyester fabric as described in Example 3, the dyeing was characterized by a greenish blue hue of good light fastness and sublimation.

EXAMPLE 8

4y-Dichloroanthrarufin

When 96 g. chrysazin in Example 1 was replaced by 96 g. anthrarufin, 85 g. 4,y-dichloroanthrarufin was obtained.

EXAMPLE 9

When 31. g 4,z-dichlorochrysazin in Example 2 was replaced by 31 g. 4,y-dichloroanthrarufin, 40 g. of a dye having the structure:

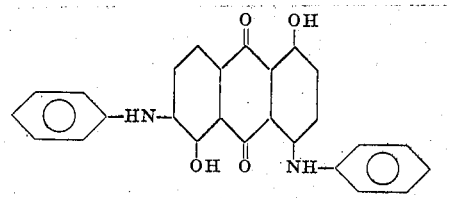

was obtained. When dispersed and applied to polyester fabric as described in Example 3, the dyeings were slightly redder than those obtained in Example 3; other properties were similar.

According to a further aspect of the invention, the dyes of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters, It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride-/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/allyl acetone, ethylene-/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrates may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

EXAMPLE 10

Methylmethacrylate resin is covered with the compound of Example 2 as the colorant, in a ratio of 2 grams resin to 1 mg. colorant. The resin is prepared by placing 1 pound of methylmethacrylate into a Thropp mill (a 2-roller mill), which is then heated and run in order to melt and smash the resin to a molten mass. The compound of Example 2 is added and the entire mixture of resin and colorant is milled until the colorant is uniformly distributed in the mass as measured by eye. While still hot, 30 grams of the hot mass is cut off for use in the following procedure. The sample, containing 30 grams methylmethacrylate and 15 mg. of the compound of Example 2 as colorant, may be conveniently molded in a Laboratory 40 Single Acting Watson-Stillman Laboratory Press (Farrell-Birmingham Co. 50-ton press). 30 grams of methylmethacrylate mixture containing 15 mg. of the compound of Example 2 per pound of methyl-methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, the mold is then closed.

The mold is held closed at zero pressure by releasing the hydraulic pressure and maintaining the steam for five minutes. The mold pressure is increased to 10 tons and held for ten minutes, the steam remaining on.

The mold pressure is increased to 15 tons and the steam shut off; the drain is opened and cooling water is added for five minutes. Thereafter the pressure is changed to zero and the mold is opened to extract the resultant plastic chip.

EXAMPLE 11

When the 30 grams of methylmethacrylate are replaced by 2 pounds polystyrene and 10.44 grams titanium dioxide, the procedure of Example 10 being otherwise followed, a fast coloration of the polystyrene is obtained.

EXAMPLE 12

The compounds of the invention may also be used as colorants for plastics made from polycarbonates. A pigmented plastic material of polycarbonates and the compound of Example 2 may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions. 454 gms. Lexan 121-R (General Electric) pellets are placed in Bipel one ounce reciprocating screw injection molder. The pellets are tumbled for five minutes on the barrel tumbler. The resin is heated (front zone temperature of 550° F and rear zone temperature of 500° F) and chips are produced from the virgin resin until chips of good quality are obtained. When the desired quality of chips are obtained with the clear resin, a fresh batch of Lexan 121-R, containing the compound of Example 2 in an equivalent amount corresponding to Example 10 to produce a pigmented plastic material is fed into the injection molder, to produce pigmented chips having excellent fastness characteristics.

EXAMPLE 13

When the compounds of Examples 3–9 are substituted for the compound of Example 2 in the process of Example 10, methylmethacrylate is colored to produce a clear blue shaped plastic material. The compounds of Examples 3–9 may be used to impart coloration to polystyrene following the procedure of Example 11 and polycarbonate is pigmented with the compounds of Examples 3–9 following the procedure of Example 12.

I claim:

1. Aromatic polyester textile fibers dyed with a dye of the formula:

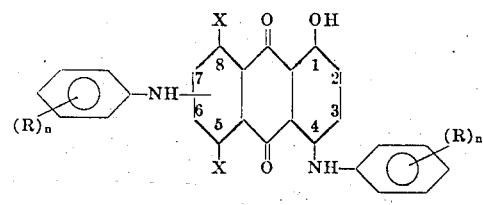

wherein one X is H and the other is OH; R is a member selected from the group consisting of hydrogen, chlorine, bromine, alkyl having from 1–8 carbon atoms, alkoxy having from 1–8 carbon atoms, hydroxy lower alkyl, N-lower alkylamino; N,N-di lower alkylamino, lower alkoxy lower alkyl, lower alkoxy lower alkoxy and acylamido having up to 7 carbon atoms; and n has a value of 1–3.

2. The dyed fibers of claim 1 wherein R is hydrogen, the X in the 8-position is OH and the other X is H.

3. The dyed fibers of claim 1 wherein R is methyl, n is 1, the X in the 8-position is OH and the other X is H.

4. The dyed fibers of claim 1 wherein one R is hydrogen, and the other R is p-methyl group, n is 1, the X in the 8-position is OH and the other X is H.

5. The dyed fibers of claim 1 wherein R is Cl, n is 1, the X in the 8-position is OH and the other X is H.

* * * * *